US005864207A

United States Patent [19]

Kume et al.

[11] Patent Number: 5,864,207

[45] Date of Patent: Jan. 26, 1999

[54] PHOTOMULTIPLIER WITH LENS ELEMENT

[75] Inventors: Hidehiro Kume; Suenori Kimura, both of Hamamatsu, Japan

[73] Assignee: Hamamatsu Photonics K.K., Hamamatsu, Japan

[21] Appl. No.: 879,052

[22] Filed: Jun. 19, 1997

[30] Foreign Application Priority Data

| | | | |
|---|---|---|---|
| Jun. 19, 1996 | [JP] | Japan | 8-158468 |
| Jun. 19, 1996 | [JP] | Japan | 8-158470 |

[51] Int. Cl.[6] .......... H04J 43/28

[52] U.S. Cl. .......... 313/533; 313/524; 313/110; 250/207; 250/214 VT

[58] Field of Search .......... 313/524, 110, 313/111, 532, 533, 103 R, 103 CM, 125 CM; 250/216, 207, 214 VT

[56] References Cited

U.S. PATENT DOCUMENTS

| | | | |
|---|---|---|---|
| 2,587,589 | 3/1952 | Bordewick | 313/101 |
| 3,551,841 | 12/1970 | Harrick | 250/207 |
| 3,567,948 | 3/1971 | Oke et al. | 250/216 |
| 5,446,529 | 8/1995 | Stettner et al. | 356/4.01 |
| 5,498,926 | 3/1996 | Kyushima et al. | 313/533 |
| 5,504,386 | 4/1996 | Kyushima et al. | 313/103 |
| 5,625,447 | 4/1997 | Kikuchi et al. | 356/4.01 |

FOREIGN PATENT DOCUMENTS

| | | | |
|---|---|---|---|
| 6011572 | 1/1994 | Japan | G01T 1/20 |
| 6-310084 | 11/1994 | Japan | H01J 43/20 |

*Primary Examiner*—Sandra O'Shea
*Assistant Examiner*—Michael Day
*Attorney, Agent, or Firm*—Pillsbury Madison & Sutro LLP

[57] ABSTRACT

A photomultiplier includes a photocathode (3); an electron multiplier section (60) for cascade-multiplying photoelectrons emitted from the photocathode (3); a faceplate (2) provided with the photocathode (3); a metal housing (1) accommodating the photocathode (3) and the electron multiplier section (60); and a structure disposed on the faceplate (2) for increasing the effective light entrance region of the faceplate (2). In a preferred embodiment the subject structure includes a lens element (30) attached to the faceplate for increasing the effective light entrance region of the faceplate (2). In order to improve the optical coupling efficiency, either the faceplate (2), or the lens element (30), or both the faceplate (2) and the lens element (30) may further include a protrusion.

25 Claims, 13 Drawing Sheets

PHOTOMULTIPLIER WITH LENS ELEMENT

BACKGROUND OF THE INVENTION

1. Field of the Invention

The present invention relates to a photomultiplier for multiplying photoelectrons emitted in response to incident light which has reached a photocathode and, in particular, to a photomultiplier having a structure for making the area of an effective light entrance region for the incident light become greater than the area of the light receiving surface of the photomultiplier.

2. Related Background Art

Conventionally, as an optical sensor for measuring weak light or the like, so-called head-on type photomultiplier has widely been used. In the head-on type photomultiplier, one end of a cylindrical vacuum container constitutes a faceplate. Though the vacuum container of such a head-on type photomultiplier is made of a glass tube in general, there has recently been developed, as disclosed in Japanese Patent Application Laid-Open No. 6-310084 or the like, a photomultiplier constituted by a cylindrical metal tube and a faceplate (where a photocathode is disposed) disposed at one end thereof and supported by a flange extending toward the tube axis of the metal tube.

SUMMARY OF THE INVENTION

In a photomultiplier comprising a metal housing, a faceplate provided with a photocathode is supported by a flange extending toward the center axis (tube axis) of the metal housing. Accordingly, the photomultiplier with such a configuration has a structural characteristic that the area of the light receiving surface of the faceplate is defined by the opening of the flange.

Since the area of the light receiving surface in the photomultiplier comprising a metal housing is narrowed by the flange as compared with the photomultiplier comprising a glass tube having the same tube diameter, however, the light receiving efficiency for the light to be detected in the former is lower than that in the latter. On the other words, since the area of an effective light entrance region through which the incident light passes corresponds to the area of the light receiving surface of the photomultiplier, the photomultiplier which the flange limits the area of the light receiving surface necessarily has a lower light receiving efficiency than the photomultiplier having a glass tube.

In order to overcome the structural characteristic inherent in the photomultiplier comprising a metal housing, it is an object of the present invention to provide a photomultiplier having a structure for making the area of the effective light entrance region for the incident light become greater than the area of the light receiving surface limited by the flange of the metal housing.

In this specification, the effective light entrance region for the incident light refers to a region which is on a plane in parallel with the light receiving surface (the surface of the faceplate on the side on which light is incident) of the photomultiplier and through which, of light advancing along a direction perpendicular to the light receiving surface, a light component which is to reach the light receiving surface passes.

In order to attain the above-mentioned object, the photomultiplier according to the present invention comprises, at least, a photocathode for emitting a photoelectron in response to incident light reaching there; an electron multiplier section for cascade-multiplying the photoelectron emitted from the photocathode; a faceplate having a mounted surface and a light receiving surface opposing the mounted surface, the mounted surface being provided with the photocathode; a metal housing extending along a predetermined center axis (tube axis) and accommodating the photocathode and the electron multiplier section; and a structure for making the area of an effective light entrance region for the incident light become greater than the area of the light receiving surface. The incident light refers to a light component which is to reach the light receiving surface within light advancing along a direction perpendicular to the light receiving surface. The above-mentioned metal housing has a flange extending toward the center axis (tube axis) of the metal housing and supporting the faceplate, whereas the flange has an opening for defining the area of the light receiving surface of the faceplate.

In the present invention, the structure for making the area of the effective light entrance region become greater than the area of the light receiving surface can be realized by a lens element disposed opposite to the electron multiplier section by way of the photocathode. The lens element has a convex surface which projects opposite to the photocathode and a coupling surface which opposes the convex surface and faces the light receiving surface.

The photomultiplier equipped with such a lens element is preferably configured such that the distance between the lens element and the faceplate is made narrower in order to keep a favorable optical coupling state between the lens element and the faceplate. Accordingly, in order to minimize the gap between the lens element and the faceplate, at least one of the lens element and faceplate is provided with a protrusion. Thus minimized gap is filled with a grease or desired adhesive as a refractive index matching material. In this configuration, the incident light can effectively be restrained from being attenuated due to the multiple reflection generated between the coupling surface of the lens element and the light receiving surface of the faceplate. As a result, the light receiving efficiency for the light to be detected (incident light) in the photocathode is remarkably improved.

In particular, when a lens element having a protrusion (with a coupling surface) is attached to the light receiving surface side of the faceplate, the coupling surface of the protrusion in the lens element preferably has an area substantially equal to the area of the light receiving surface of the faceplate in order to prevent the optical coupling efficiency from lowering. On the other hand, since the electron multiplier section and the like of the photomultiplier according to the present invention are accommodated in a metal housing to which a predetermined voltage is directly applied, it is preferred that the photomultiplier further comprise a case made of a nonconductive member (such as ceramic material or plastic material), having an opening through which incident light passes, for accommodating the metal housing therein.

Further, the photomultiplier according to the present invention preferably has an optical positioning structure for the lens element. Namely, this positioning structure is realized by a protrusion disposed on a surface of the lens element facing the light receiving surface and a depression accommodating the protrusion. Specifically, the depression includes a depression defined by the opening of the flange in the metal housing and the light receiving surface of the faceplate. In this configuration, a part of the protrusion of the lens element is accommodated in the depression. Here, when the metal housing is accommodated in the above-mentioned case made of the nonconductive material, the protrusion of the lens penetrates through the opening of the case, while a part thereof is accommodated in the depression defined by the flange of the metal housing and the light receiving surface of the faceplate.

Even when the above-mentioned faceplate is configured so as to include a light receiving surface while comprising a protrusion projecting toward the lens element, on the other hand, the positioning structure for the lens element can be realized. Namely, when the metal housing is accommodated in the case made of a nonconductive member having an opening for transmitting the incident light therethrough, at least a part of the protrusion in the lens element can be accommodated in the depression defined by the opening of the case and the light receiving surface of the faceplate. Also in this configuration, the positioning structure for the lens element can be realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the present invention will be explained with reference to FIGS. 1 to 22. Among the drawings, members and sections identical to each other will be referred to with marks identical to each other without their overlapping explanations repeated.

Figure 1:
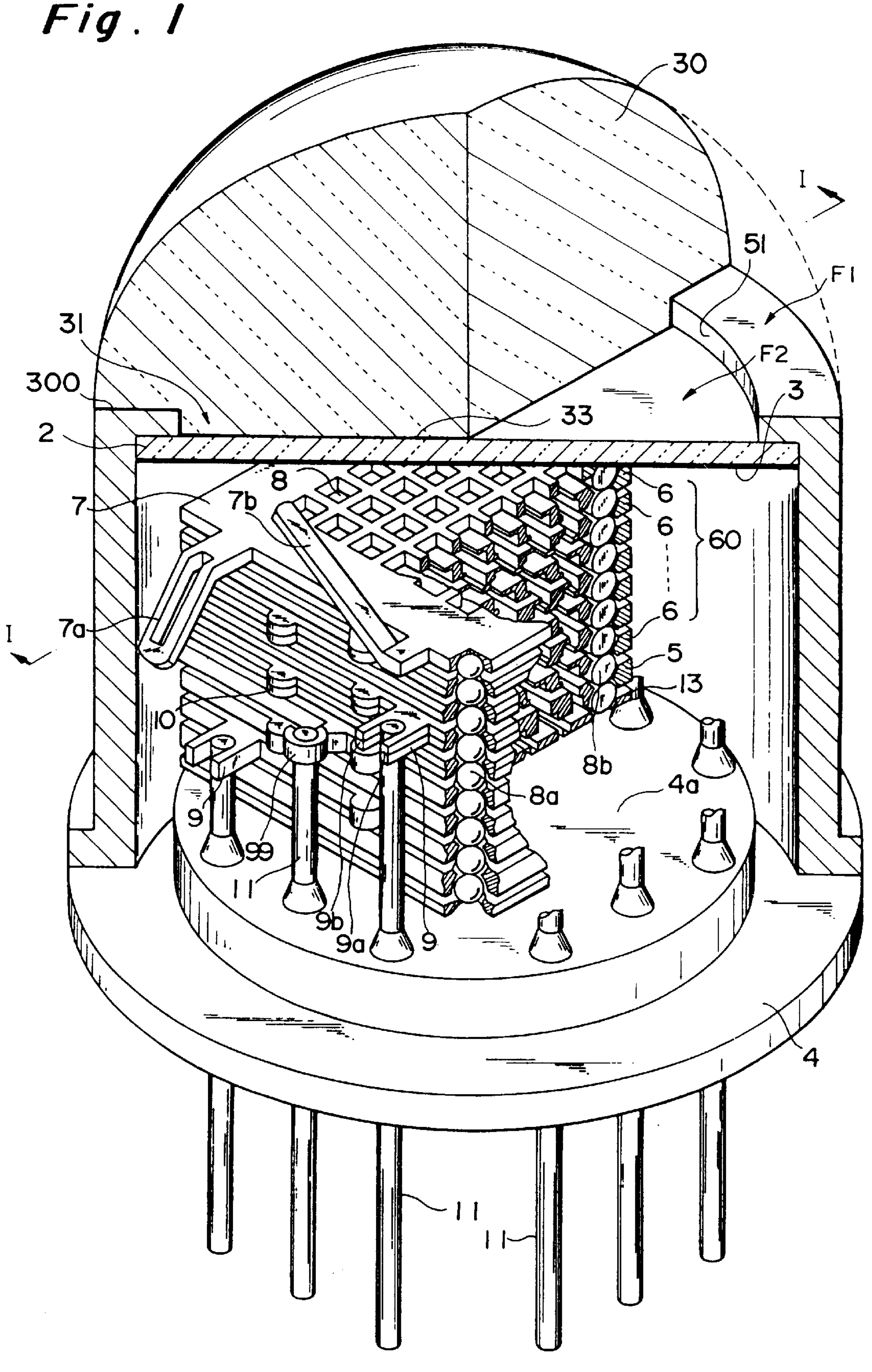
FIG. 1 is a partially sectional perspective view showing a configuration of a first embodiment of the photomultiplier according to the present invention.
Figure 2:
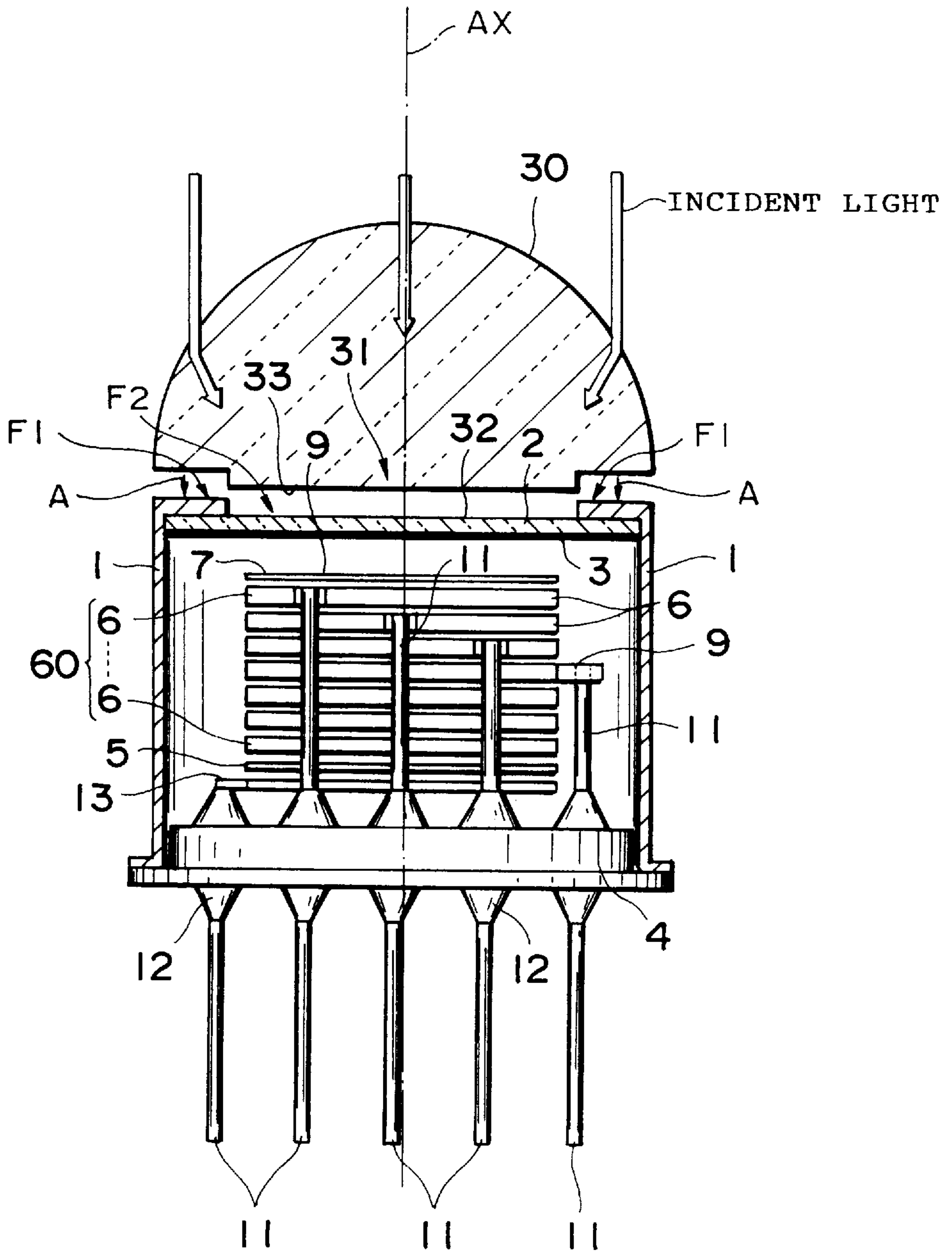
FIG. 2 is a cross-sectional view showing a configuration of the first embodiment of the photomultiplier taken along line I—I in FIG. 1.

FIG. 1 is a partially sectional perspective view showing an overall configuration of a first embodiment of the photomultiplier according to the present invention, whereas FIG. 2 is a cross-sectional view showing a configuration of the photomultiplier in the first embodiment taken along line I—I in FIG. 1. The photomultiplier according to the present invention is of a head-on type and has a cylindrical vacuum container.

In FIGS. 1 and 2, the photomultiplier comprises, as its basic configuration, a photocathode 3 (transmission type photocathode) and an electron multiplier section. The electron multiplier section includes an anode (anode plate 5) and a dynode unit 60 disposed between the photocathode 3 and the anode.

The electron multiplier section is mounted on a metal stem 4 so as to be disposed at a predetermined position within a metal housing 1 which is structurally integrated with the stem 4. The photocathode 3 is formed, by vapor deposition, on a mounted surface (surface opposite to a light receiving surface F2 on which light is incident) of a faceplate 2 attached to the metal housing 1, within the metal housing 1. Further, the metal housing 1 is provided with a flange extending toward a tube axis AX (center axis) of the metal housing 1. The flange has an opening, which defines the area of the light receiving surface F2 of the faceplate 2. The anode is supported by the anode plate 5, so as to be disposed between the dynode unit 60 and the stem 4. The dynode unit 60 is constituted by a plurality of dynode plates 6, respectively supporting multiple stages of dynodes which receive photoelectrons emitted from the photocathode 3 and cascade-multiply them, laminated in the direction of incidence of the photoelectrons.

The photomultiplier further comprises a focusing electrode 8 disposed between the dynode unit 60 and the photocathode 3. The focusing electrode 8 is supported by a focusing electrode plate 7, which is secured to the electron entrance side of the dynode unit 60 by way of insulators 8*a* and 8*b*. The focusing electrode plate 7 comprises a holder spring 7*a* and a contact terminal 7*b* which are integrally formed therewith. The holder spring 7*a* is in contact with an inner side wall of the metal housing 1 in order to keep the installing position of the dynode unit 60 secured to the focusing electrode plate 7 by way of the insulators 8*a* and 8*b*. The contact terminal 7*b* is in contact with the photocathode 3 so as to make the focusing electrode 8 and the photocathode 3 have the same potential. Here, even when the focusing electrode plate 7 has no contact terminal 7*b*, a predetermined voltage can be supplied to the photocathode 3 by way of the metal housing 1.

Further, the anode is supported by the anode plate 5. The anode plate 5 comprises a plurality of anode portions, while having an electron transmitting hole, disposed so as to correspond to a position where a secondary electron emitted from the last stage of the dynode unit 60 reaches, for transmitting the secondary electron therethrough. Accordingly, the photomultiplier comprises, between the anode plate 5 and the stem 4, a reversal type dynode plate 13 for supporting a reversal type dynode in parallel with the anode plate 5. The reversal type dynode plate 13 reverses the orbit of the secondary electrons, which have passed through the anode plate 5, such that they are directed toward the respective anode portions.

In particular, the photomultiplier is constituted by the dynode unit 60, in which a plurality of dynode plates 6 respectively supporting a plurality of stages of dynodes for cascade-multiplying an electron flow incident thereon are laminated in the direction of incidence of the electron flow while being separated from each other by a predetermined distance therebetween by the insulators 8*a* and 8*b*; and the anode plate 5 opposing the dynode plate 6 in the last stage of the dynode unit 60 by way of the insulators 8*a* and 8*b*.

Further, in the photomultiplier, each dynode plate 6 comprises, at a predetermined position of its outer periphery, an engagement member 9 which is adapted to engage with one of connection pins 11 for supplying a predetermined voltage. The engagement member 9 is constituted by a pair of guide strips 9*a* and 9*b* for guiding each connection pin 11. Here, the engagement member may be formed like a key (such as an engagement member 99 shown in FIG. 1). The form of the engagement member is not restricted in particular as long as it can receive and engage with the connection pin 11. On the other hand, a part of the connection pin 11 near its end portion may be made of a metal material having a rigidity lower than that of the other part.

Each dynode plate 6 utilizes two sheets of plates, each having an opening section for forming the dynode, closely in contact with each other and welded together such that their opening sections coincide with each other. In order to weld these two plates together, the plates respectively have tabs 10 for welding them located at predetermined positions of the outer periphery which meet each other when the plates are stacked.

Figure 3A:
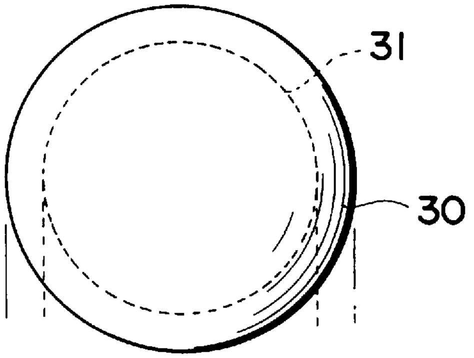
FIG. 3 is a view showing a configuration of a lens element.
Figure 3B:
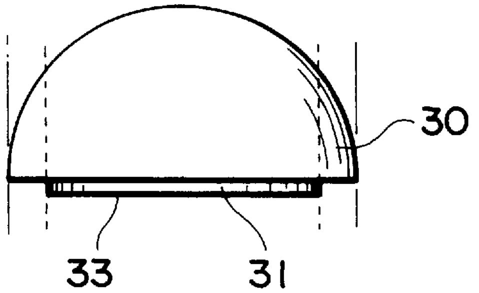
Figure 3C:
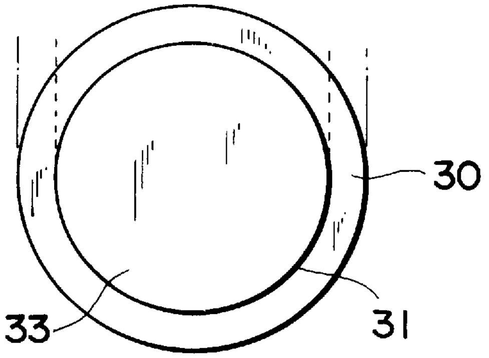

In the photomultiplier of the first embodiment (FIGS. 1 and 2), as a lens element 30, a plano-convex lens or, preferably, a hemispherical lens is secured onto the light receiving surface F2 of the faceplate 2 by way of an adhesive 300. The diameter of the lower surface (surface facing the light receiving surface F2) of the hemispherical lens is substantially equal to the outer diameter of the metal housing 1. As will be explained later, the hemispherical lens functions to expand the area of the effective light entrance region for light which is to reach the light receiving surface F2 of the faceplate 2. For this purpose, it is preferred that the hemispherical lens be disposed such that its optical axis coincides with an axis AX of the metal housing 1. When the lower surface of the hemispherical lens is flat, however, it is difficult for the hemispherical lens element to be disposed at a desired position, thereby necessitating a skill. Accordingly, in the first embodiment, as shown in FIG. 3, a columnar protrusion 31 including a coupling surface 33 which faces the light receiving surface F2 is integrally formed with the lower surface of the hemispherical lens (lens element 30) concentrically with the optical axis thereof, so as to mate with a depression 32 defined by a step difference 51 between the flange of the metal housing 1 and the faceplate 2.

Here, the lens element 30 equipped with the protrusion 31 can be obtained either by processing of a glass material or by injection molding of a plastic material. The outer diameter of the protrusion 31 is substantially equal to the diameter of the depression 32, i.e., the inner diameter (opening diameter) of the flange. In other words, the areas of the coupling surface 33 and light receiving surface F2 substantially coincide with each other. Also, the periphery of the depression 32 is defined by the inner periphery 51 of the flange opening, whereas the opening center of the flange is on the tube axis AX of the metal housing 1 (see FIG. 4). Accordingly, when the protrusion 31 of the lens element 30 is inserted into the depression 32 along arrows indicated by the arrow A in FIG. 2, the peripheral surfaces of the protrusion 31 and depression 32 fit together with a minimum gap therebetween, thereby the optical axis of the lens element 30 can coincide with the tube axis AX of the metal housing 1 (see FIG. 5).

In order to completely accommodate the protrusion 31 in the depression 32 and bring the coupling surface 33 of the protrusion 31 and the light receiving surface F2, which is the bottom surface of the depression 32, in close contact with each other, it is preferred that the height of the protrusion 31 substantially coincide with the depth of the depression 32. In general, the faceplate 2 and the metal housing 1 are bonded together by heat fusion. Consequently, the surface (light receiving surface F2) of the faceplate 2 may curve. Therefore, the height of the protrusion 31 is determined in response to the form of the light receiving surface F2. Here, in order to improve the optical efficiency, it is preferably designed such that a front surface F1 of the flange and the lens element 30 fit together with a minimum gap therebetween.

Though various methods can be employed for bonding the lens element 30 onto the light receiving surface F2, it is preferred that an optical adhesive such as optical cement or silicone rubber having a refractive index equal to that of the lens element 30 be disposed between the depression 32 and the protrusion 31 of the lens element 30 so as to bond them together. In this case, since the optical adhesive exists between the light receiving surface F2 and the coupling surface 33 of the lens element 30, the optical efficiency improves.

Figure 4:
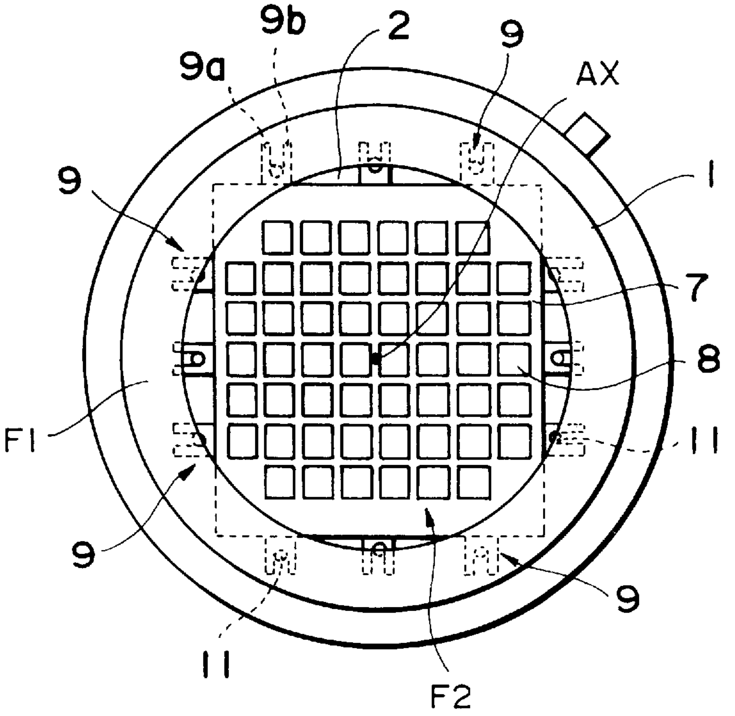
FIG. 4 is a plan view of the photomultiplier shown in FIG. 1 (in a state before a lens element is installed) observed from its direction of incidence of light.
Figure 5:
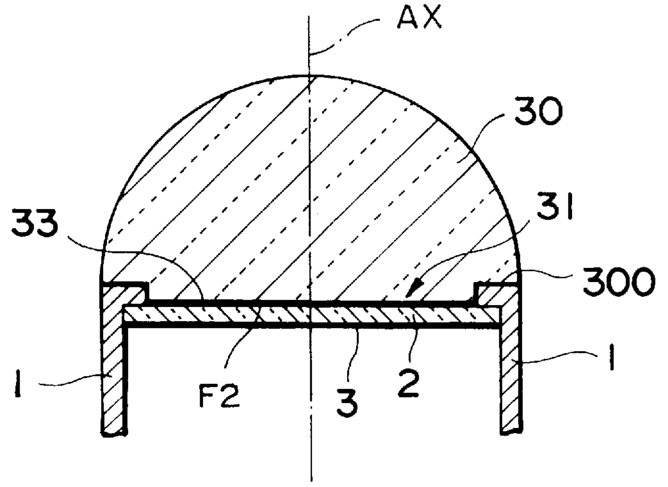
FIG. 5 is a cross-sectional view showing a structure for securing a lens element in the photomultiplier shown in FIG. 1 (first embodiment), corresponding to the cross-sectional view taken along line I—I in FIG. 1.

Thus selected adhesive 300 is applied to the front surface F1 of the flange and the light receiving surface F2 of the photomultiplier shown in FIG. 4, and the protrusion 31 of the lens element 30 shown in FIG. 3 is accommodated in the depression 32 defined by the flange and the light receiving surface F2, thereby positioning and securing operations are effected (see FIG. 5).

In order to form the protrusion 31 of the lens element 30, it is necessary for the peripheral surface and lower surface (coupling surface 33) of the protrusion 31 to be smoothed by grinding. The purpose of this grinding processing is to prevent its position from easily shifting or optical diffusion such as reflection or absorption of the light to be detected from occurring at a boundary portion between the coupling surface 33 and the light receiving surface F2.

In order to confirm the fact that the area of the effective light entrance region for incident light becomes greater than the area of the light receiving surface F2 (i.e., increase in light receiving efficiency) by the lens element 30, the inventors have conducted experiments as follows.

Figure 6:
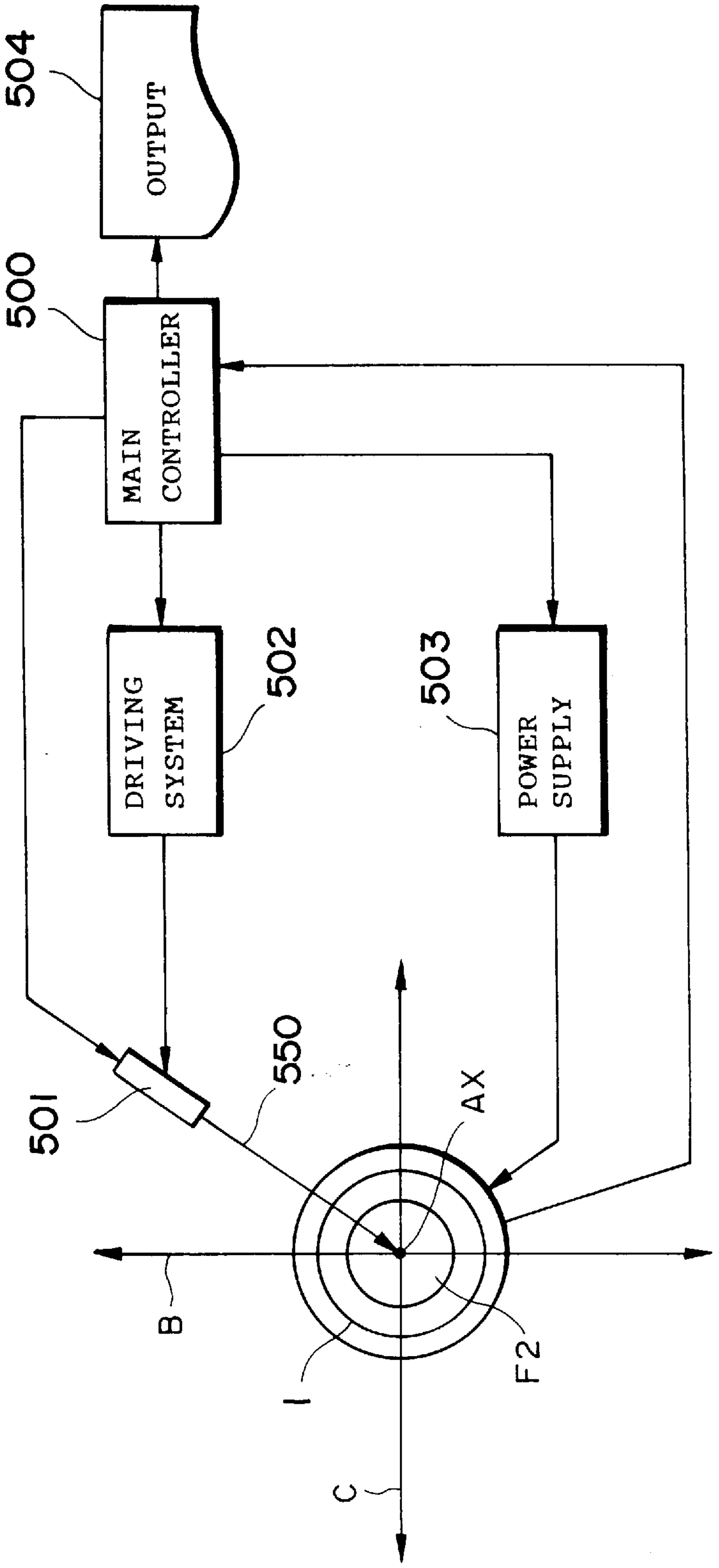
FIG. 6 is a view for explaining a configuration of a measurement system for measuring the area of the effective light entrance region of a photomultiplier in a state before a lens element is installed.

FIG. 6 is a view showing a configuration of a measurement system for measuring the area of the effective light entrance region in a photomultiplier without a lens element. This measurement system comprises a light source 501 for emitting a collimated laser beam 550 having a predetermined wavelength; a driving system 502 for moving the light source 501 on a plane in parallel with the light receiving surface F2; a power supply 503 for applying a desired voltage to an object to be measured (photomultiplier without a lens element); a main controller 500 for regulating each of the light source 501, driving system 502, and power supply 503, while receiving an output current (electric signal) from the object to be measured; and an output section 504 such as printer or display. In particular, the driving system 502 scans the laser beam 550 along the directions indicated by the arrows B and those indicated by the arrows C (directions orthogonal to the directions indicated by the arrows B) in this drawing, in a state where its direction of emission from the light source 501 coincides with the normal direction of the light receiving surface F2.

Figure 8:
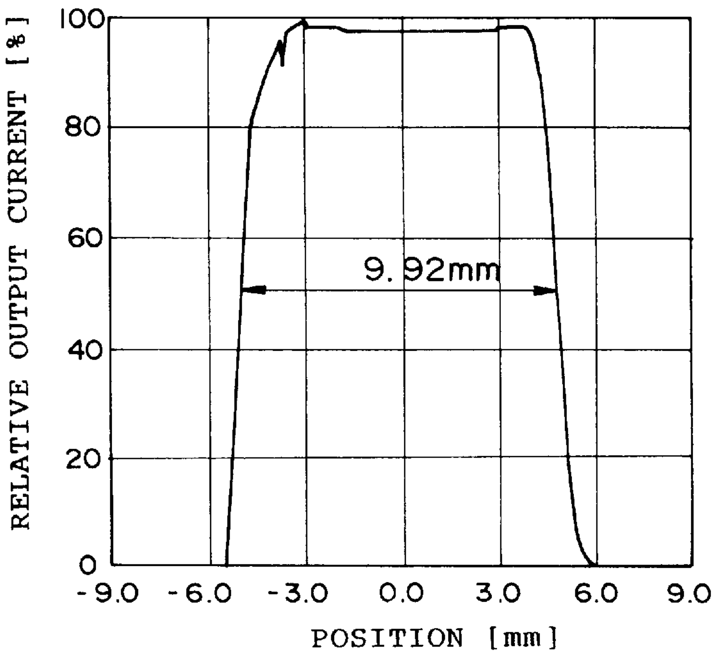
FIG. 8 is a (first) graph showing a result of measurement effected by the measurement system shown in FIG. 6, indicating a relationship, obtained when a laser beam perpendicular to a plane including the effective light entrance region is scanned along directions indicated by the arrows B in FIG. 6 (diametrical directions of a photomultiplier), between the incident position of the laser beam and the relative output current (%) of the photomultiplier.
Figure 9:
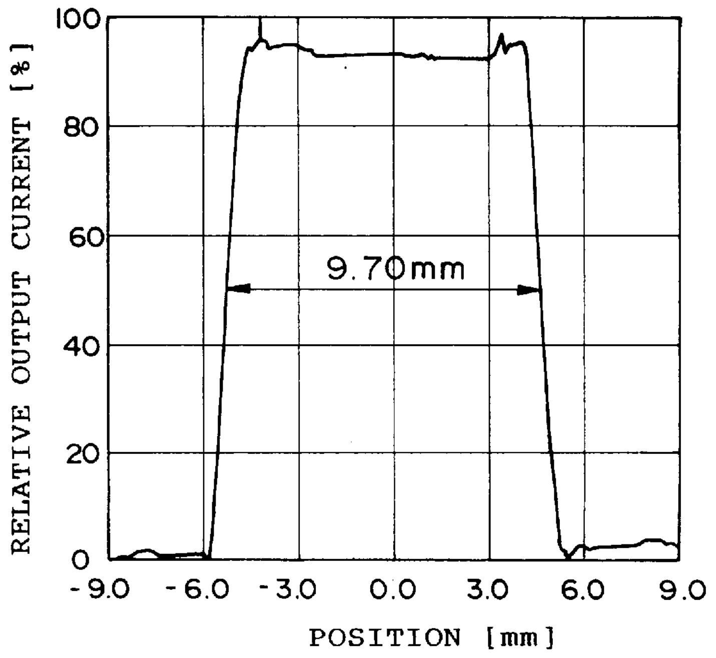
FIG. 9 is a (second) graph showing a result of measurement effected by the measurement system shown in FIG. 6, indicating a relationship, obtained when a laser beam perpendicular to a plane including the effective light entrance region is scanned in directions indicated by the arrows C in FIG. 6 (directions perpendicular to the directions indicated by the arrows B), between the incident position of the laser beam and the relative output current (%) of the photomultiplier.

FIGS. 8 and 9 show the results of measurement obtained by the measurement system of FIG. 6. FIG. 8 shows the output current obtained when the laser beam 550 is scanned along the directions indicated by arrows B in FIG. 6, whereas FIG. 9 shows the output current obtained when the laser beam 550 is scanned along the directions indicated by arrows C in FIG. 6. In each graph, the ordinate is expressed in terms of a relative value (%) of each output current with respect to the yielded maximum output current.

Here, the outer diameter of the housing (outer diameter of the flange) of the object to be measured is 14 mm, the diameter of the light receiving surface F2 is 10 mm, the wavelength of the irradiated laser beam 550 is 400 nm, and the supplied maximum voltage is 800 V. The half-widths of the graphs (FIGS. 8 and 9) obtained under this condition are 9.92 mm and 9.70 mm, respectively, thereby indicating that, in the photomultiplier without a lens element, the area of the effective light entrance region substantially coincides with the area of the light receiving surface F2.

Figure 7:
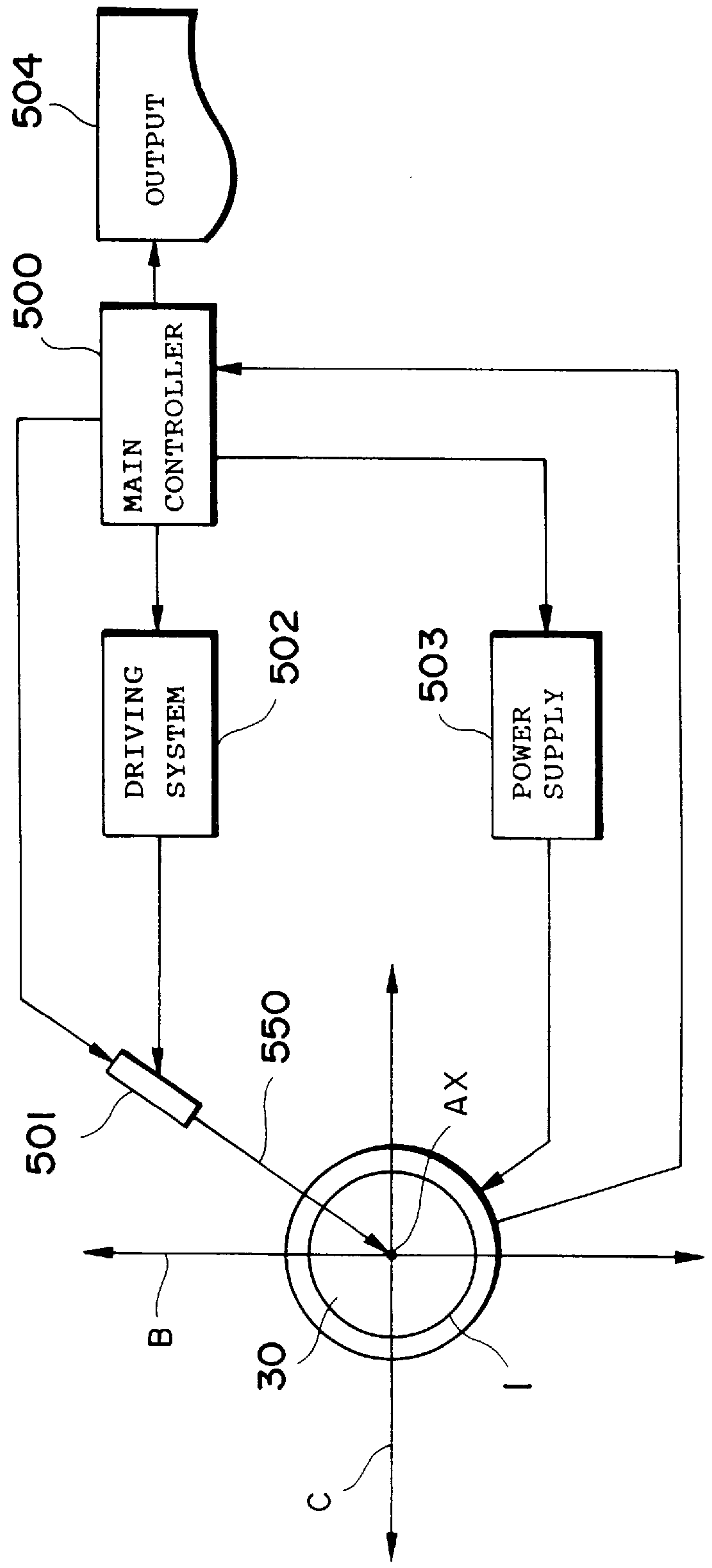
FIG. 7 is a view for explaining a configuration of a measurement system for measuring the area of the effective light entrance region of a photomultiplier equipped with a lens element.

FIG. 7, on the other hand, is a view showing a configuration of a measurement system for measuring the area of the effective light entrance region in a photomultiplier equipped with a lens element. This measurement system also comprises the light source 501, driving system 502, power supply 503, main controller 500, and output section 504. As in the case of the measurement system of FIG. 6, the driving system 502 scans the collimated laser beam 550 from the light source 501 in the directions indicated by the arrows B and those indicated by the arrows C (directions orthogonal to the directions indicated by the arrows B) in FIG. 7, in a state where its direction of emission from the light source 501 coincides with the normal direction of the light receiving surface F2.

Figure 10:
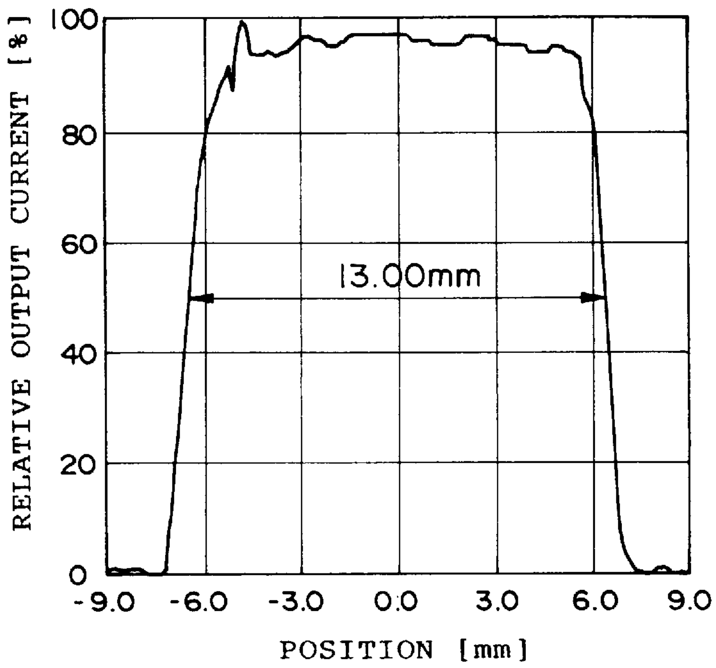
FIG. 10 is a (first) graph showing a result of measurement effected by the measurement system shown in FIG. 7, indicating a relationship, obtained when a laser beam perpendicular to a plane including the effective light entrance region is scanned in directions indicated by the arrows B in FIG. 7 (diametrical directions of a photomultiplier equipped with a lens), between the incident position of the laser beam and the relative output current (%) of the photomultiplier equipped with the lens element.
Figure 11:
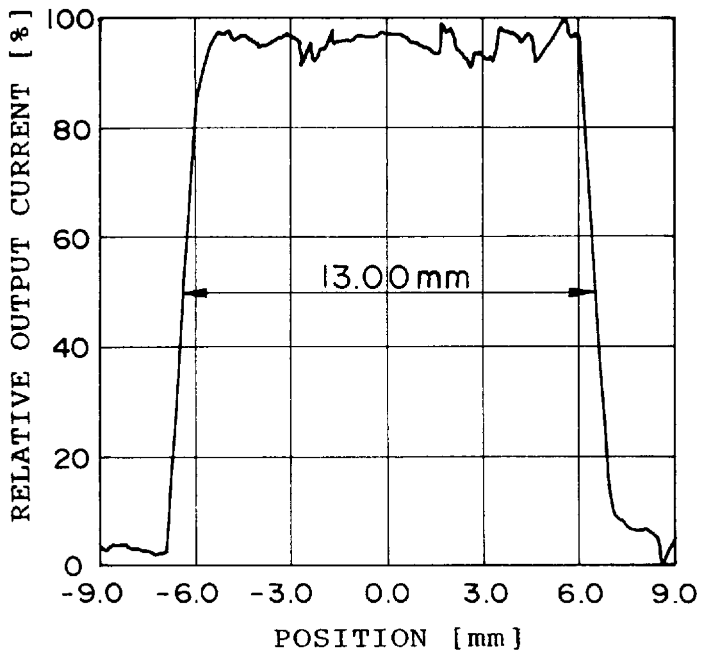
FIG. 11 is a (second) graph showing a result of measurement effected by the measurement system shown in FIG. 7, indicating a relationship, obtained when a laser beam perpendicular to a plane including the effective light entrance region is scanned in directions indicated by the arrows C in FIG. 7 (directions perpendicular to the directions indicated by the arrows B), between the incident position of the laser beam and the relative output current (%) of the photomultiplier equipped with the lens element.

FIGS. 10 and 11 show the results of measurement obtained by the measurement system of FIG. 7. FIG. 10 shows the output current obtained when the laser beam 550 is scanned along the directions indicated by the arrows B in FIG. 7, whereas FIG. 11 shows the output current obtained when the laser beam 550 is scanned along the directions indicated by the arrows C in FIG. 7. In each graph, the ordinate is expressed in terms of a relative value (%) of each output current with respect to the yielded maximum output current.

Here, the diameter of the lens element 30 (hemispherical lens) is 14 mm, the outer diameter of the housing (outer diameter of the flange) of the object to be measured is 14 mm, the diameter of the light receiving surface F2 is 10 mm, the wavelength of the irradiated laser beam 550 is 400 nm, and the supplied maximum voltage is 800 V. The half-widths of the graphs (FIGS. 10 and 11) obtained under this condition are both 13.00 mm, thereby indicating that, in the photomultiplier equipped with the lens element, the area of the effective light entrance region is clearly made greater than the area of the light receiving surface F2.

Figure 12:
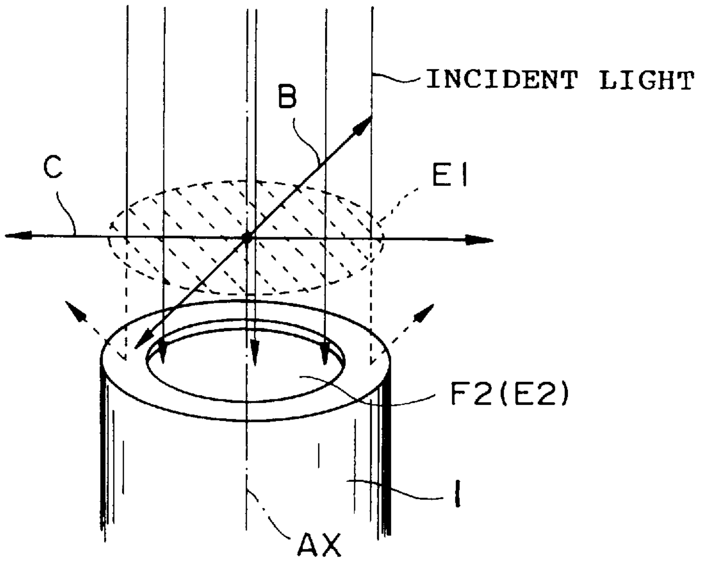
FIGS. 12 and 13 are views for explaining a function of making the area of the effective light entrance region for incident light become greater than the area of the light receiving surface, in the photomultiplier according to the present invention.
Figure 13:
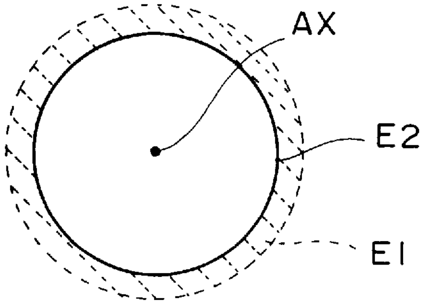

When the light to be detected is incident on the photomultiplier thus equipped with the lens element as indicated by the arrows in FIG. 2, even the light component from directly thereabove in the normal direction of the front surface F1 of the flange is deflected by the hemispherical lens 30 so as to be directed toward the center of the light receiving surface F2. By contrast, when there is no lens element, as shown in FIG. 12, the area E1 of the effective light entrance region substantially coincides with an area E2 of the light receiving surface F2. Thus, due to the lens element 30, the effective light entrance region having the area E1 is enlarged (the hatched area in FIG. 13 indicating the increased portion). Also, since the lens element 30 does not shift its position, the photocathode accurately receives, with a high light receiving efficiency, the light to be detected. When such light to be detected is received by the photocathode 3, due to its photoelectric effect, a greater number of photoelectrons are released into a vacuum (within the metal housing 1) as compared with those conventionally released. These photoelectrons are multiplied in a by means of the electron multiplier section, and a greater number of thus generated secondary electron groups are collected at the anode as compared with those conventionally collected, thereby a higher electric signal is outputted from the pin 11 to the outside. Accordingly, in the photomultiplier of the first embodiment, a higher sensitivity can be obtained with a higher accuracy as compared with the prior art.

Figure 14:
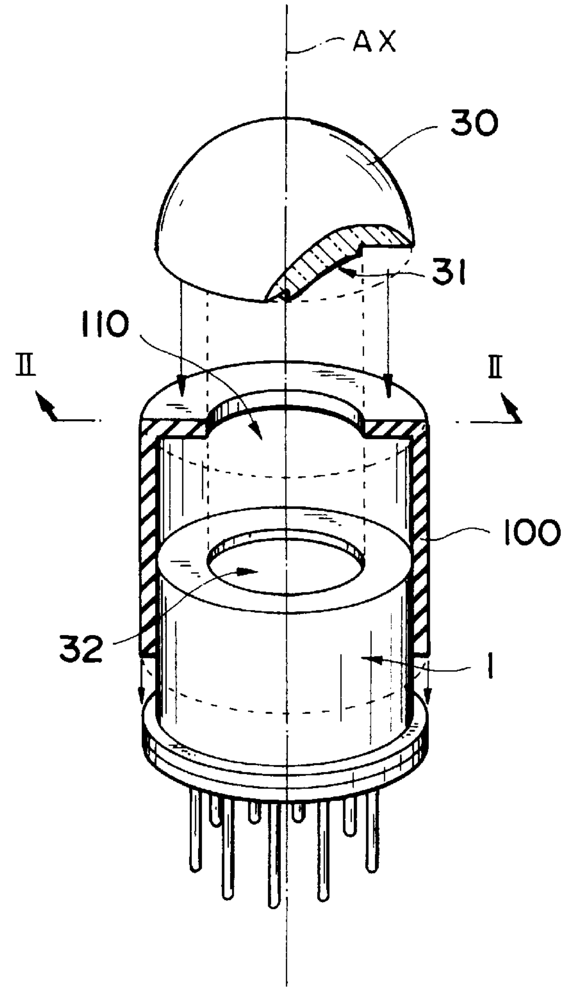
FIG. 14 is a view showing a configuration of a second embodiment of the photomultiplier according to the present invention.

Here, in view of the safety in handling, as shown in FIG. 14, the photomultiplier according to the present invention may be configured such that the metal housing 1 is accommodated in a case made of a nonconductive material such as ceramic material or plastic material.

Figure 15:
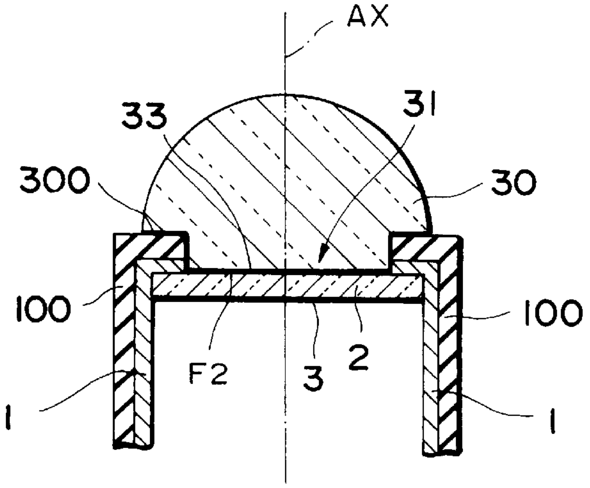
FIG. 15 is a cross-sectional view showing a part of a configuration of the photomultiplier in the second embodiment taken along line II—II in FIG. 14.

FIG. 15 is a cross-sectional view of a second embodiment of the photomultiplier according to the present invention (configuration thereof near its faceplate) taken along line II—II in FIG. 14. The results similar to those mentioned above can also be obtained when a part of the protrusion 31 (including the coupling surface 33) of the lens element 30 is thus accommodated, by way of the case 100, in the depression 32 defined by the flange and the light receiving surface F2.

As explained in the foregoing, in the photomultipliers of the first and second embodiments, since the lens element (such as a hemispherical lens representing a plano-convex lens) is bonded to the light receiving surface, the advancing direction of light to be detected incident on the faceplate is deflected toward the center thereof, thereby the light receiving efficiency of the photocathode is enhanced. Also, the protrusion having the coupling surface is formed on the lower surface of the lens element, so as to be fitted into the depression formed in the vacuum container including the metal housing and faceplate. In thus obtained photomultiplier, adapted to be installed without a skill, comprising the lens element with an excellent optical coupling efficiency, a higher sensitivity can be attained with a higher accuracy as compared with the prior art.

Further, in order to improve the optical coupling efficiency between the coupling surface of the lens element (surface from which the light to be incident on the light receiving surface F2 passing through the lens element is emitted toward the light receiving surface F2) and the light receiving surface F2, in place of the protrusion formed in the lens element, the faceplate 2 may be provided with a protrusion 201 projecting toward the lens element.

Figure 16:
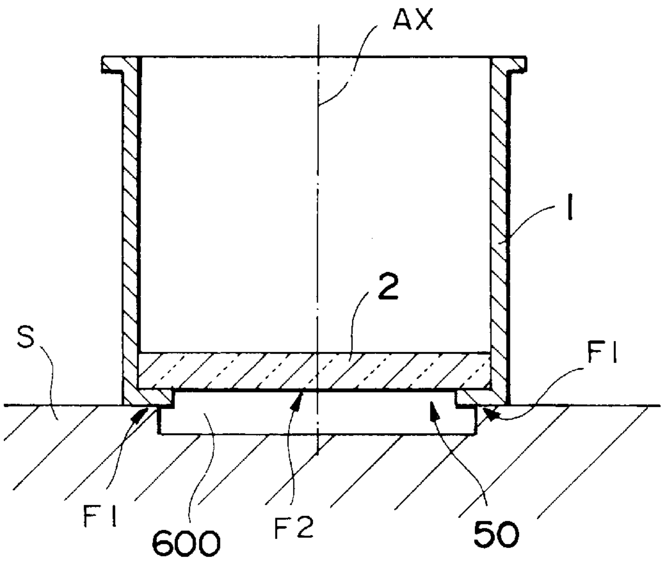
FIGS. 16 to 18 are views for explaining a process for making a faceplate having one surface on which a photocathode is formed.
Figure 17:
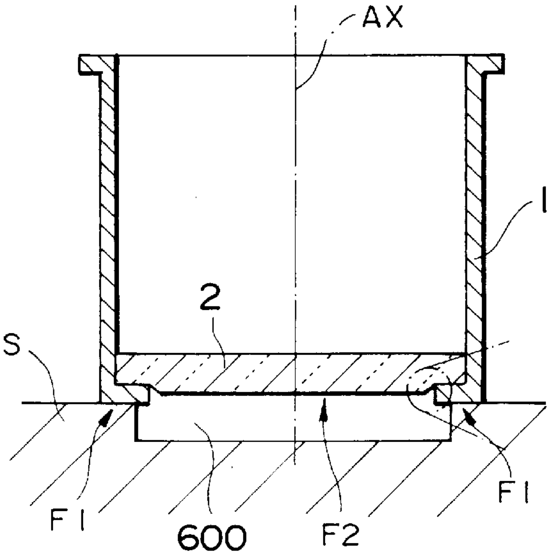
Figure 17A:
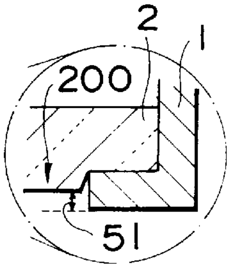
Figure 18:
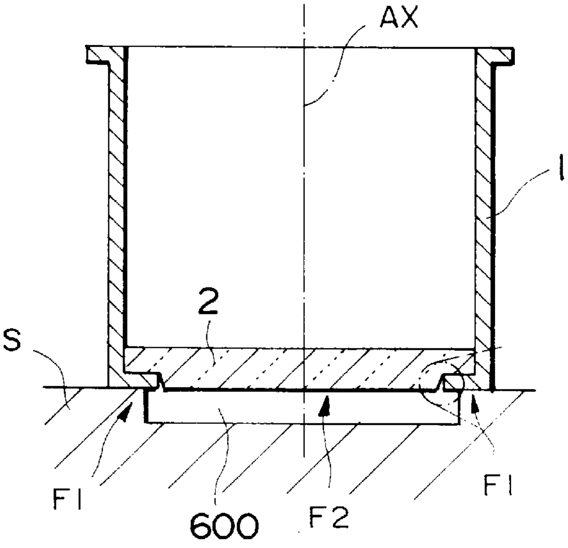
Figure 18A:
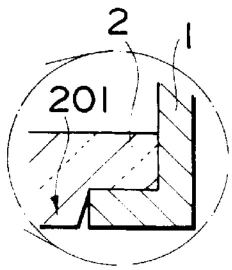

In the following, a process of fusing and securing (by heat fusion) the faceplate 2 to the flange of the metal housing 1 will be explained with reference to FIGS. 16 to 18. FIG. 16 shows a step of placing the faceplate 2 in the metal housing 1 and heating thus placed faceplate 2. FIG. 17 shows a configuration of the flange of the metal housing 1 and the faceplate 2 (with the step difference 51) after the heat fusion. FIG. 18 shows a configuration of the metal housing 1 and the faceplate 2 after the heat fusion (in a state where the protrusion 201 of the faceplate 2 is accommodated in the opening of the flange).

Specifically, first, an electric furnace (not depicted) equipped with a table S made of carbon having a cylindrical depression 600 with a diameter smaller than that of the metal housing 1 but greater than that of the flange opening is prepared. Then, as shown in FIG. 16, the metal housing 1 is set on the table S such that the flange is faced down while the faceplate 2 is mounted on the inner surface of the flange. In this state, the depression 50 defined by the flange opening and the faceplate 2 opposes the depression 600 of the table S. Thereafter, as the faceplate 2 and the metal housing 1 are heated by the electric furnace, a part 200 of the faceplate 2 is melted down (see FIG. 17). Here, the inventors have confirmed that, when the metal housing 1 made of a covar metal and the faceplate 2 made of a covar glass are heated for an hour at an atmospheric temperature of 850° C., in the state shown in FIG. 17, the height of the protruded part 200 is about 0.05 mm, while the thickness of the flange is about 0.2 mm, thereby the sufficient step difference 51 having a height of about 0.15 mm can be attained.

When the heating step is further continued, a part of the faceplate 2 is melted down such that its light receiving surface F2 and the front surface Fl of the flange coincide with each other, thereby the faceplate 2 having the protrusion 201 and the metal housing 1 can be fused together as shown in FIG. 18. Here, even when the protrusion 201 of the faceplate 2 is formed with a height exceeding the front surface F1 of the flange, it does not come into contact with the table S and thereby cannot be contaminated with carbon in the table S.

When the lens element 30 (e.g., hemispherical lens) is optically coupled with the faceplate 2 having thus formed protrusion 201, they come into close contact with each other and are bonded together. In order to bring the lens element 30 in close contact with the flange and the light receiving surface F2 of the faceplate 2, it is preferred that the height of the protrusion 201 be substantially equal to the thickness of the flange.

In the following, a third embodiment of the photomultiplier according to the present invention equipped with both of the faceplate 2 having thus manufactured protrusion 201 and a lens element 35 for enlarging the effective light entrance region will be explained.

Figure 19:
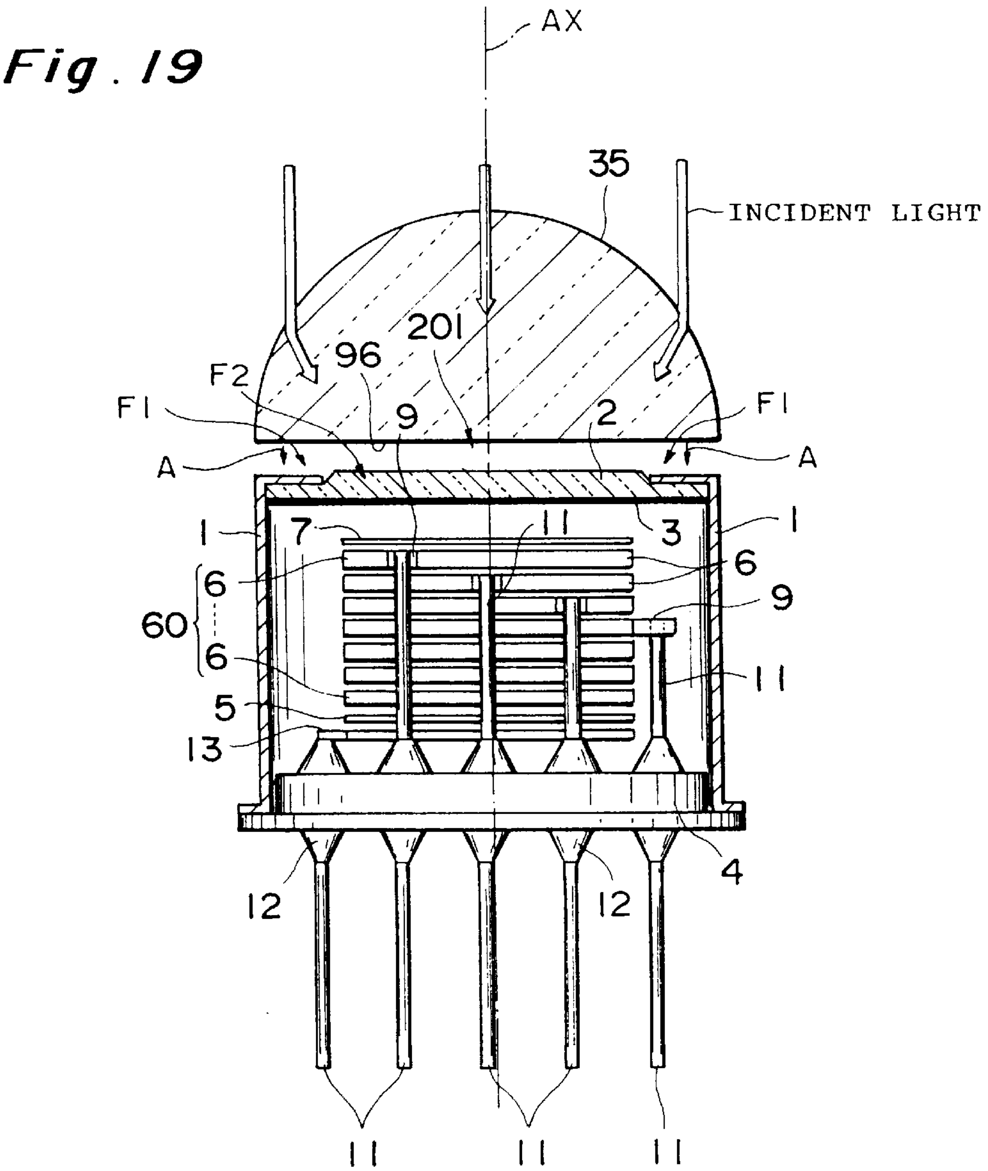
FIG. 19 is a cross-sectional view showing a configuration of a third embodiment of the photomultiplier according to the present invention, corresponding to a cross-sectional view taken along line I—I in FIG. 1.
Figure 20:
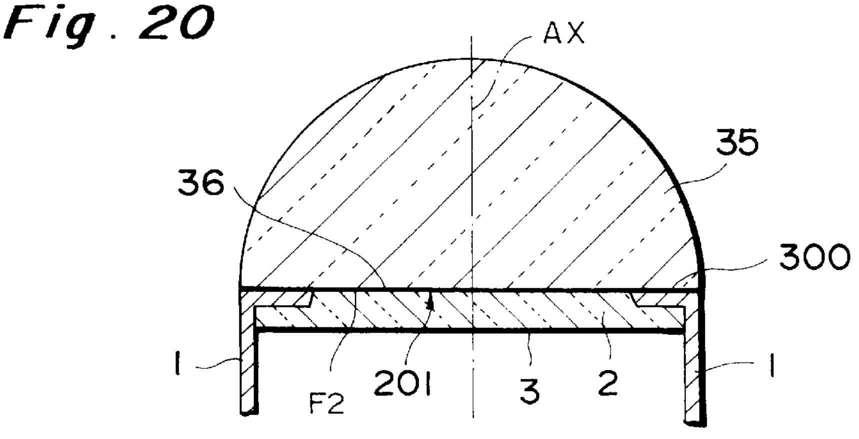
FIG. 20 is a cross-sectional view showing a structure for securing a lens element in the photomultiplier shown in FIG. 19 (third embodiment)

FIG. 19 is a cross-sectional view showing a configuration of the third embodiment according to the present invention, corresponding to a cross-sectional view taken along line I—I in FIG. 1. FIG. 20 is a cross-sectional view showing the bonding state of the lens element 35 and faceplate 2 in the photomultiplier shown in FIG. 19. The photomultiplier in the third embodiment is of a so-called head-on type and has a cylindrical vacuum container.

The vacuum container is constituted by a cylindrical metal tube (part of the metal housing 1); the faceplate 2 made of, for example, a UV glass hermetically bonded to the inner surface of the flange, which is formed at one end of the metal tube so as to extend toward the tube axis AX; and the circular stem 4, disposed at the other end of the metal side tube, on which the electron multiplier section is mounted. Further, the photocathode 3 is formed on the inner surface (mounted surface) of the faceplate 2.

Within the vacuum container (within the metal housing 1), successively disposed from the side of the photocathode 3 are the focusing electrode plate 7, the dynode unit 60 in which a plurality of steps of dynode plates 6 each supporting a two dimensional array of electron multiplying holes (dynodes) are laminated, the anode plate 5, and the reversal type dynode 13. The engagement member 9 is disposed around the outer peripheral portion of plates 7, 6, 5, 13 so as to project therefrom and connect with one end of its corresponding connection pin 11 secured to the stem 4 by a glass member 12, whereas the other end of the connection pin 11 penetrates through the stem 4 to the outside.

Further, in the photomultiplier according to the third embodiment, as the lens element 35, a plano-convex lens or, preferably, a hemispherical lens is secured onto the light receiving surface F2 included in the protrusion 201 of the faceplate 2. The diameter of the lower surface of the hemispherical lens is substantially equal to the outer diameter of the flange of the metal housing 1. Also, the lower surface of the hemispherical lens is processed so as to become particularly flat. As mentioned above, the hemispherical lens is used for making the area of the effective light entrance region become greater than the area of the light receiving surface F2. For this purpose, it is preferred that the hemispherical lens be disposed such that its optical axis coincides with the tube axis AX of the metal housing 1. In the third embodiment, the gap generated between the hemispherical lens and the light receiving surface F2 (coupling surface 36) of the faceplate 2 is filled with the protrusion 201 formed in the faceplate 2, thereby the light to be detected is prevented from being attenuated by multiple reflection between the coupling surface 36 of the lens element 35 and the light receiving surface F2.

In the manufacture in practice, the height of the protrusion 201 of the faceplate 2 may slightly fluctuate with respect to the position of the front surface F1 of the flange. In order to fill the gap therebetween caused by this fluctuation, they are preferably bonded together by means of an optical adhesive such as optical cement or silicone rubber having a refractive index equal to that of the lens element 35. In this case, since the optical adhesive exists between the faceplate 2 and the lens element 35, the optical efficiency improves.

Here, it is more preferable that the lower surface (coupling surface 36) of the lens element 35 and the light receiving surface F2 included in the protrusion 201 be ground flat. It is due to the fact that optical diffusion such as reflection or scattering of the light to be detected is thereby prevented from occurring at a boundary portion between the coupling surface 36 and the light receiving surface F2.

Also in the photomultiplier according to the third embodiment, when the light to be detected is incident thereon as indicated by the arrows in FIG. 19, even the incident light component advancing toward the front surface F1 of the flange is deflected by the lens element 35 so as to be directed toward the center of the light receiving surface F2. Consequently, the area of the effective light entrance region increases (see FIG. 13). Also, in the photomultiplier of the third embodiment, since the gap between the coupling surface 36 of the lens element 35 and the light receiving surface F2 becomes narrow, the light to be detected having a high light receiving efficiency is received by the photocathode 3 without being attenuated by multiple reflection. When such light to be detected is received by the photocathode 3, due to its photoelectric effect, a greater number of photoelectrons are released into a vacuum (within the metal housing 1) as compared with those conventionally released. These photoelectrons are multiplied by means of the electron multiplier section, and a greater number of thus generated secondary electron groups are collected at the anode as compared with those conventionally collected, thereby a higher electric signal is outputted from the pin 11 to the outside. Accordingly, in the photomultiplier of the third embodiment, a higher sensitivity can be obtained with a higher accuracy as compared with the prior art.

Figure 21:
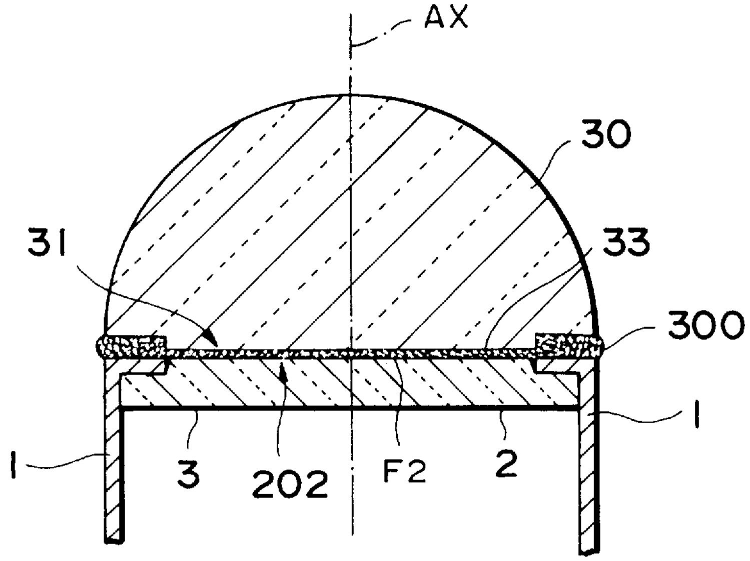
FIG. 21 is a cross-sectional view showing a structure for securing a lens element in a fourth embodiment of the photomultiplier according to the present invention.

In the photomultiplier of the third embodiment, the lens element 30 having the protrusion 31 shown in FIG. 3 may be employed as well. FIG. 21 is a cross-sectional view showing a (part of) configuration of a fourth embodiment of the photomultiplier according to the present invention. In the fourth embodiment, the coupling surface 33 of the protrusion 31 and the light receiving surface F2 oppose each other by way of the optical adhesive 300.

Figure 22:
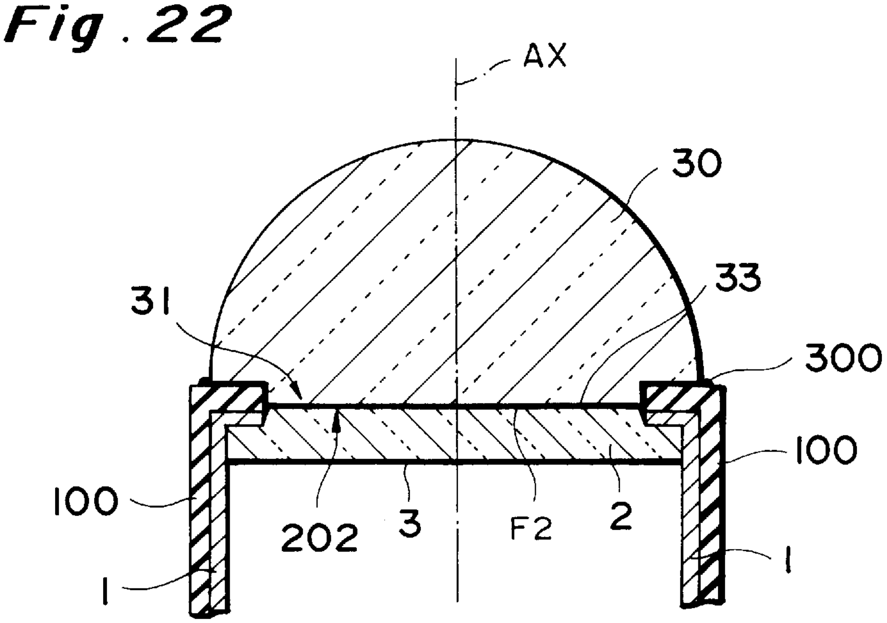
FIG. 22 is a cross-sectional view showing a structure for securing a lens element in a fifth embodiment of the photomultiplier according to the present invention.

In the fourth embodiment, however, the positioning of the lens element 30 may be difficult. Therefore, the nonconductive case 100 may be employed in the photomultiplier of the fourth embodiment. FIG. 22 is a cross-sectional view showing a (part of) configuration of a fifth embodiment of the photomultiplier according to the present invention. In the fifth embodiment, the metal housing 1 is accommodated in the case 100, thereby the safety in handling is secured. Also, since a depression is defined by the opening of the case 100 and the light receiving surface F2, a structure for securing the lens element to a predetermined position can be realized at the same time.

Also in the photomultipliers according to the third to fifth embodiments, since the lens element (such as a hemispherical lens representing a plano-convex lens) is bonded to the light receiving surface, the advancing direction of the light to be detected incident on the faceplate is deflected toward the center thereof, thereby the light receiving efficiency of the photocathode is enhanced. Also, since the protrusion is formed in the faceplate, no unnecessary gap is formed between the lens element and the faceplate. Consequently, reflection or scattering of the light to be detected which may occur at their boundary portion is minimized, thereby the light to be detected received by the photocathode is prevented from being attenuated. Accordingly, the photomultipliers of these embodiments also have a higher sensitivity as compared with the prior art.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 8-158468 (158468/1996) filed on Jun. 19, 1996 and No. 8-158470 (158470/1996) filed on Jun. 19, 1996 are hereby incorporated by reference.

What is claimed is:

1. A photomultiplier comprising:

a photocathode for emitting a photoelectron in response to incident light reaching said photocathode;

an electron multiplier section for cascade-multiplying the photoelectron emitted from said photocathode;

a faceplate having a mounted surface and a light receiving surface opposing said mounted surface, said mounted surface being provided with said photocathode;

a metal housing extending along a predetermined center axis and accommodating said photocathode and said electron multiplier section, said metal housing having a flange which extends toward said center axis and supports said faceplate, said flange having an opening for defining an area of said light receiving surface of said faceplate; and a lens element provided on an opposite side to said electron multiplier section by way of said faceplate, said lens element having a convex surface projecting opposite to said faceplate, a coupling surface opposing said convex surface and facing said light receiving surface, and a protrusion projecting toward said light receiving surface of said faceplate and including said coupling surface.

2. A photomultiplier according to claim 1, wherein at least a part of said protrusion of said lens element is accommodated in a depression defined by said opening of said flange of said metal housing and said light receiving surface of said faceplate.

3. A photomultiplier according to claim 2, further comprising a case made of a nonconductive member, said case accommodating said metal housing and having an opening for transmitting the incident light therethrough, and wherein, in a state where said protrusion of said lens element penetrates through said opening of said case, a part of said protrusion is accommodated in said depression defined by said opening of said flange of said metal housing and said light receiving surface of said faceplate.

4. A photomultiplier according to claim 1, wherein said coupling surface of said protrusion of said lens element has an area substantially equal to the area of said light receiving surface of said faceplate.

5. A photomultiplier according to claim 1, wherein said faceplate comprises a protrusion including said light receiving surface and projecting toward said lens element.

6. A photomultiplier according to claim 5, further comprising a case made of a nonconductive member, said case accommodating said metal housing and having an opening for transmitting the incident light therethrough, and wherein at least a part of said protrusion of said lens element is accommodated in a depression defined by said opening of said case and said light receiving surface of said faceplate.

7. A photomultiplier according to claim 1, further comprising an adhesive for filling at least a space between said lens element and said light receiving surface of said faceplate so as to secure said lens element to said light receiving surface.

8. A photomultiplier comprising:

a photocathode for emitting a photoelectron in response to incident light reaching said photocathode;

an electron multiplier section for cascade-multiplying the photoelectron emitted from said photocathode;

a lens element provided on an opposite side to said electron multiplier section by way of said photocathode, said lens element having a convex surface projecting opposite to said photocathode, and a coupling surface opposing said convex surface and facing said photocathode;

a metal housing extending along a predetermined center axis and accommodating said photocathode and said electron multiplier section, said metal housing having a flange which extends toward said center axis and has an opening for transmitting the incident light therethrough; and a faceplate having a mounted surface which is provided with said photocathode surface, and a light receiving surface opposing said mounted surface, said faceplate being supported by said flange of said metal housing and having a protrusion which projects toward said lens element and includes said light receiving surface, said light receiving surface being positioned between said coupling surface of said lens element and said photocathode.

9. A photomultiplier according to claim 8, wherein said lens element has a protrusion projecting toward said light receiving surface of said faceplate and including a coupling surface facing said light receiving surface.

10. A photomultiplier according to claim 9, wherein said coupling surface of said protrusion of said lens element has an area substantially equal to an area of said light receiving surface of said faceplate.

11. A photomultiplier according to claim 9, further comprising a case made of a nonconductive member, said case accommodating said metal housing and having an opening for transmitting the incident light therethrough, and wherein at least a part of said protrusion of said lens element is accommodated in a depression defined by said opening of said case and said light receiving surface of said faceplate.

12. A photomultiplier according to claim 8, further comprising an adhesive for filling at least a space between said lens element and said light receiving surface of said faceplate so as to secure said lens element to said light receiving surface.

13. A photomultiplier comprising:

a photocathode for emitting a photoelectron in response to incident light reaching said photocathode;

an electron multiplier section for cascade-multiplying the photoelectron emitted from said photocathode;

a faceplate having a mounted surface and a light receiving surface opposing said mounted surface, said mounted surface being provided with said photocathode;

a metal housing extending along a predetermined center axis and accommodating said photocathode and said electron multiplier section, said metal housing having a flange which extends toward said center axis and supports said faceplate, said flange having an opening for defining an area of said light receiving surface of said faceplate; and a structure disposed on said faceplate for making the area of an effective light entrance region become greater than the area of said light receiving surface defined by said opening of said flange, said effective light entrance region being on a plane in parallel with said light receiving surface and transmitting, of light advancing along a direction perpendicular to said light receiving surface, a predetermined light component therethrough, said predetermined light component reaching said light receiving surface.

14. A photomultiplier according to claim 13, wherein said structure includes a lens element provided on an opposite side to said electron multiplier section through said photocathode, said lens element having a convex surface projecting opposite to said photocathode, and a coupling surface opposing said convex surface and facing said photocathode.

15. A photomultiplier according to claim 14, wherein said lens element has a protrusion projecting toward said light receiving surface of said faceplate and including said coupling surface.

16. A photomultiplier according to claim 15, wherein said coupling surface of said protrusion of said lens element has an area substantially equal to the area of said light receiving surface of said faceplate.

17. A photomultiplier according to claim 15, wherein at least a part of said lens element is accommodated in a depression defined by said opening of said flange of said metal housing and said light receiving surface of said faceplate.

18. A photomultiplier according to claim 15, further comprising a case made of a nonconductive member, said case accommodating said metal housing and having an opening for transmitting the incident light therethrough, and wherein said protrusion of said lens element penetrates through said opening of said case while at least a part of said protrusion is accommodated in a depression defined by said opening of said flange of said metal housing and said light receiving surface of said faceplate.

19. A photomultiplier according to claim 15, wherein said faceplate comprises a protrusion including said light receiving surface and projecting toward said lens element.

20. A photomultiplier according to claim 19, further comprising a case made of a nonconductive member, said case accommodating said metal housing and having an opening for transmitting the incident light therethrough, and wherein at least a part of said protrusion of said lens element is accommodated in a depression defined by said opening of said case and said light receiving surface of said faceplate.

21. A photomultiplier according to claim 14, wherein said faceplate comprises a protrusion including said light receiving surface and projecting toward said lens element.

22. A photomultiplier according to claim 21, wherein said lens element has a protrusion projecting toward said light receiving surface of said faceplate and including said coupling surface.

23. A photomultiplier according to claim 22, wherein said coupling surface of said protrusion of said lens element has an area substantially equal to the area of said light receiving surface of said faceplate.

24. A photomultiplier according to claim 22, further comprising a case made of a nonconductive member, said case accommodating said metal housing and having an opening for transmitting the incident light therethrough, and wherein at least a part of said protrusion of said lens element is accommodated in a depression defined by said opening of said case and said light receiving surface of said faceplate.

25. A photomultiplier according to claim 13, further comprising an adhesive for filling at least a space between said lens element and said light receiving surface of said faceplate so as to secure said lens element to said light receiving surface.

* * * * *